(12) United States Patent
Nakano et al.

(10) Patent No.: US 7,292,746 B2
(45) Date of Patent: Nov. 6, 2007

(54) ALL-OPTICAL FLIP-FLOP

(75) Inventors: Yoshiaki Nakano, Tokyo (JP); Mitsuru Takenaka, Tokyo (JP)

(73) Assignee: Japan Science and Technology Agency, Kawaguchi-shi (JP)

( * ) Notice: Subject to any disclaimer, the term of this patent is extended or adjusted under 35 U.S.C. 154(b) by 0 days.

(21) Appl. No.: 10/799,786

(22) Filed: Mar. 12, 2004

(65) Prior Publication Data

US 2004/0190562 A1   Sep. 30, 2004

Related U.S. Application Data

(63) Continuation-in-part of application No. PCT/JP02/09238, filed on Sep. 10, 2002.

(30) Foreign Application Priority Data

Sep. 13, 2001   (JP)   ............... 2001-278213

(51) Int. Cl.
    *G02B 6/26* (2006.01)
(52) U.S. Cl. ............... 385/15; 385/14; 385/16; 385/17; 385/24; 385/39; 385/40; 385/42; 385/46; 385/130; 385/131; 385/122
(58) Field of Classification Search .................. 385/14, 385/15
    See application file for complete search history.

(56) References Cited

U.S. PATENT DOCUMENTS 3,439,289 A    4/1969  Kosonocky 6,298,180 B1 *  10/2001  Ho ............... 385/15
6,522,462 B2 *   2/2003  Chu et al. ........... 359/344
6,788,838 B2 *   9/2004  Ho ............... 385/15

FOREIGN PATENT DOCUMENTS

EP    0 898 346 A1    2/1999

(Continued)

OTHER PUBLICATIONS

Jian, B.B. Continuous-wave operation of monolithic two-mode optical flip-flop with etched laser mirrors. Sep. 26, 1996. Electronics Letters, vol. 32 No. 20 pp. 1923-1925.*

(Continued)

*Primary Examiner*—Frank G. Font
*Assistant Examiner*—Erin Chiem
(74) *Attorney, Agent, or Firm*—Christensen O'Connor Johnson Kindness PLLC

(57) ABSTRACT

The present invention provides a set-reset flip-flop operating in an all-optical manner. In this invention, a set pulse is inputted from the setting port. In doing so, only oscillation in set mode is generated at the multi-mode interference portion in a waveguide. As a result, a non-inverting output Q is obtained from the non-inverting output port. This state is then continued even if the set pulse input goes off. Next, a reset pulse is inputted to the resetting port. In doing so, at the multi-mode interference portion, oscillation of light in the set mode is halted, and oscillation in the reset mode occurs. As a result, it is possible to obtain an inverting output Q-bar from the inverting output port. This state is then continued even if the reset pulse goes off.

17 Claims, 10 Drawing Sheets

FOREIGN PATENT DOCUMENTS

| | | |
|---|---|---|
| JP | 51-25710 B1 | 8/1976 |
| JP | 51-25710 A | 5/1993 |
| JP | 06-13714 A | 1/1994 |
| WO | WO96/13084 A1 | 5/1996 |

OTHER PUBLICATIONS

El-Refaei, H.H., and D.A.M. Khalil, "Design of Strip-Loaded Weak-Guiding Multimode Interference Structure for an Optical Router," *IEEE Journal of Quantum Electronics* 34(12):2286-2290, Dec. 1998.

Jian, B.B., "Continuous-Wave Operation of Monolithic Two-Mode Optical Flip-Flop With Etched Laser Mirrors," *Electronics Letters* 32(20):1923-1925, Sep. 26, 1996.

Johnson, J.E., and C.L. Tang, "Optical Flip-Flop Based on Two-Mode Intensity Bistability in a Cross-Coupled Bistable Laser Diode," *Applied Physics Letters* 63(24):3273-3275, Dec. 13, 1993.

Soldano, L.B., and E.C.M. Pennings, "Optical Multi-Mode Interference Devices Based on Self-Imaging: Principles and Applications," *Journal of Lightwave Technology* 13(4):615-627, Apr. 1995.

Soldano, L.B., et al., "Planar Monomode Optical Couplers Based on Multimode Interference Effects," *Journal of Lightwave Technology* 10(12):1843-1850, Dec. 1992.

Watanabe, M., "Bistability Between Two Crosscoupled Lateral Modes in Twin-Stripe Lasers," *Bulletin of the Electrotechnical Laboratory* 57(11):69-77, Nov. 1993.

PTO International Search Report for PCT/JP02/09238.

Watanabe, M., et al., "An Optical Set-Reset Flip-Flop Semiconductor Laser With Two Mutually Complementary Outputs," *Proceedings of the International Conference on Optical Computing*, Edinburgh, U.K., Aug. 22-24, 1994, pp. 581-584.

* cited by examiner (a)

(b)

| SET | RESET | MODE 1 | MODE 2 |
|---|---|---|---|
| 0 | 0 | KEEP PREVIOUS VALUE | KEEP PREVIOUS VALUE |
| 0 | 1 | 0 | 1 |
| 1 | 0 | 1 | 0 |
| 1 | 1 | PROHIBITED INPUT | PROHIBITED INPUT |

US 7,292,746 B2

ALL-OPTICAL FLIP-FLOP

CROSS-REFERENCE TO RELATED APPLICATION

This application is a continuation-in-part of prior Application No. PCT/JP02/09238, filed Sep. 10, 2002, priority from the filing date of which is hereby claimed under 35 U.S.C. § 120.

BACKGROUND OF THE INVENTION

1. Field of the Invention

The present invention relates to a flip-flop that operates in an all-optical manner.

2. Description of the Related Art

With the advancement of optical communication networks, an aim has been set to achieve all-optical signal processing. It is considered that, if this is achieved, this will bring about optical communication at a higher-speed with lower power consumption. Flip-flops that operate in an all-optical manner are therefore necessary as basic devices for enabling all-optical signal processing.

It is therefore an object of the present invention to provide, in response to the aforementioned circumstances, a set-reset flip-flop capable of operating in an all-optical manner.

SUMMARY OF THE INVENTION

An all-optical flip-flop of this invention is provided with a semiconductor laser. The semiconductor laser is equipped with a waveguide. The waveguide comprises a multimode interference portion, input port, and output port. The input port and output port are connected to the multi-mode interference portion. The configuration is such that a plurality of input ports are provided so as to enable a set pulse from one or more input ports and a reset pulse from one or more remaining input ports to be inputted to the multi-mode interference portion. The multi-mode interference portion allows multi-mode light to pass within, and selectively outputs from the output ports light outputted due to oscillation based on a set pulse and a reset pulse inputted from the input ports.

The configuration can be also such that oscillation based on the set pulse and the reset pulse generates different modes according to the set pulse and the reset pulse.

It is also possible to provide a plurality of output ports.

The input port or the output port may also be configured to allow single mode light to pass.

The input ports and output ports may also be provided with saturable absorption regions.

End surfaces of the input port and output port may also be taken to be reflecting surfaces.

The input port may also double as the output port.

A mirror for reflecting inputted light may also be provided at the multi-mode interference portion.

A circulator for switching over paths for inputted and outputted light can also be fitted at the input port doubling as the output port.

DESCRIPTION OF THE PREFERRED EMBODIMENTS

An all-optical flip-flop of a first embodiment of the present invention will now be described in the following with reference to the attached drawings. This flip-flop is basically configured from a semiconductor laser 1. A power supply (not shown) is connected to the laser 1 in order to drive the laser 1.

Figure 1:
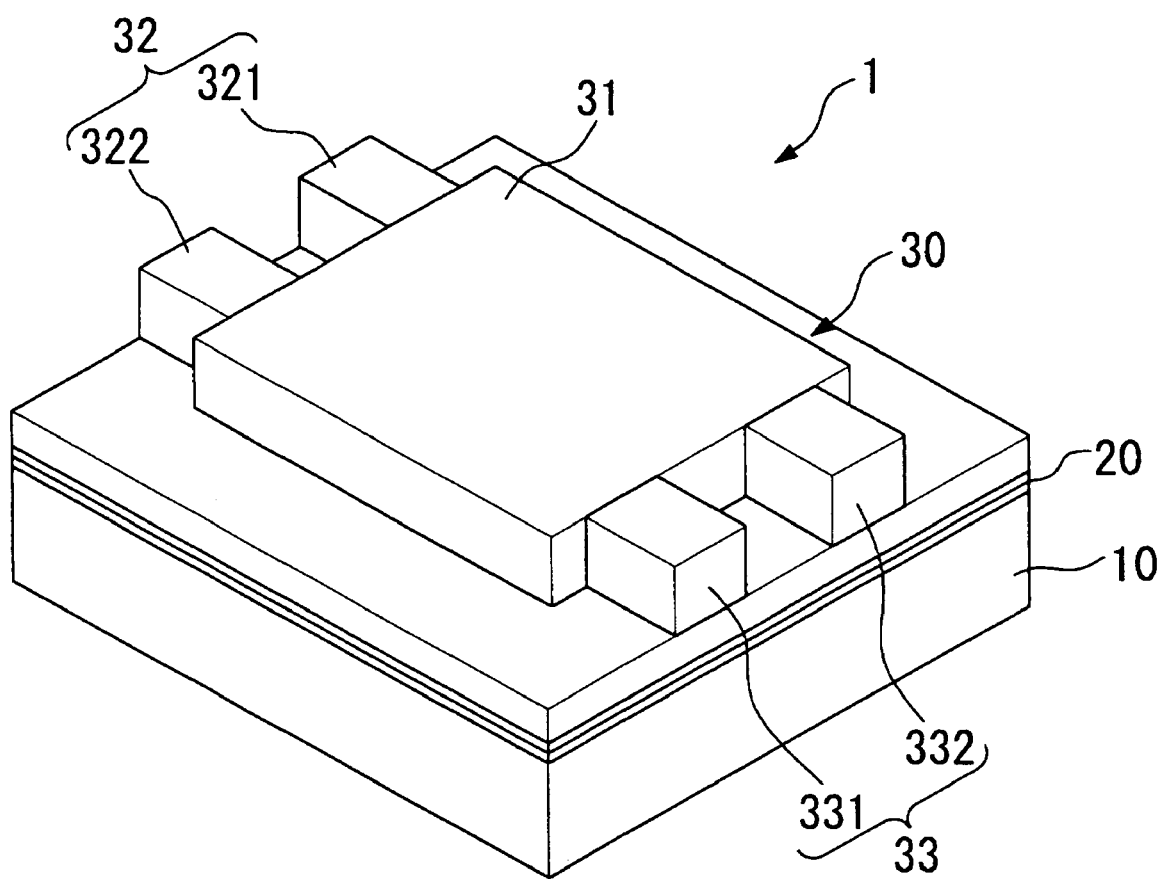
FIG. 1 is a perspective view showing an outline configuration for an all-optical flip-flop of a first embodiment of the present invention.

The laser 1 is equipped with a substrate 10, activation layer 20, and waveguide 30 (refer to FIG. 1). The substrate 10 and activation layer 20 are the same as for a conventional semiconductor laser.

The waveguide 30 is comprised of a multimode interference portion 31, input port 32, and output port 33. The input port 32 and the output port 33 are connected to the multi-mode interference portion 31 (refer to FIGS. 1 and 2).

The input port 32 has a set port 321 and reset port 322. This enables the input port 32 to input a set pulse from the set port 321 (one or more of the ports) and a reset pulse from the reset port 322 (one or more other ports) to the multimode interference portion 31. Saturable absorption regions 34 are provided at the set port 321 and the reset port 322 (refer to FIG. 2). The saturable absorption regions 34 may easily be formed by not providing a power supply bringing about operation as a semiconductor laser to these portions. As is well known, absorption saturation occurs at the saturable absorption regions 34 when the power of inputted light exceeds a threshold value. Waveguides (not shown) for inputting light (a set pulse and a reset pulse) to corresponding ports are connected to the set port 321 and the reset port 322, respectively.

The output port 33 has a non-inverting output port 331 and an inverting output port 332. The non-inverting output port 331 is for obtaining a non-inverted output (corresponding to set output Q). The inverting output port 332 is for obtaining an inverted output (corresponding to reset output Q-bar). Waveguides (not shown) for obtaining output light are connected to the non-inverting output port 331 and the inverting output port 332.

The input port 32 and output port 33 are configured so as to transmit (allow to pass) single mode light. The end surfaces of the input port 32 and output port 33 are reflecting surfaces for reflecting laser light within the laser. The reflectance of the laser light occurring at the reflecting surfaces depends on design specifications, but may be, for example, 30%.

The multimode interference portion 31 is capable of transmitting multiple modes of light within. Further, the multimode interference portion 31 is configured so as to be capable of selectively outputting output light at the output port by oscillating based on a set pulse and a reset pulse inputted from the input port. More specifically, selective oscillation takes place within the multimode interference portion 31 using two modes of oscillation passing in an intersecting manner within. On one side, there exists an oscillating mode taking a path arriving at the non-inverting output port 331 from the set port 321. On the other side, there exists an oscillating mode taking a path arriving at the inverting output port 333 from a reset port 322. Path selection for coherent light using multi-mode interference is well known as technology such as MMI (Multi-Mode Interference) couplers etc., and a more detailed description thereof is therefore omitted here. Further, other aspects of the configuration of the waveguide 30 are the same as for waveguides of the related art.

Figure 3:
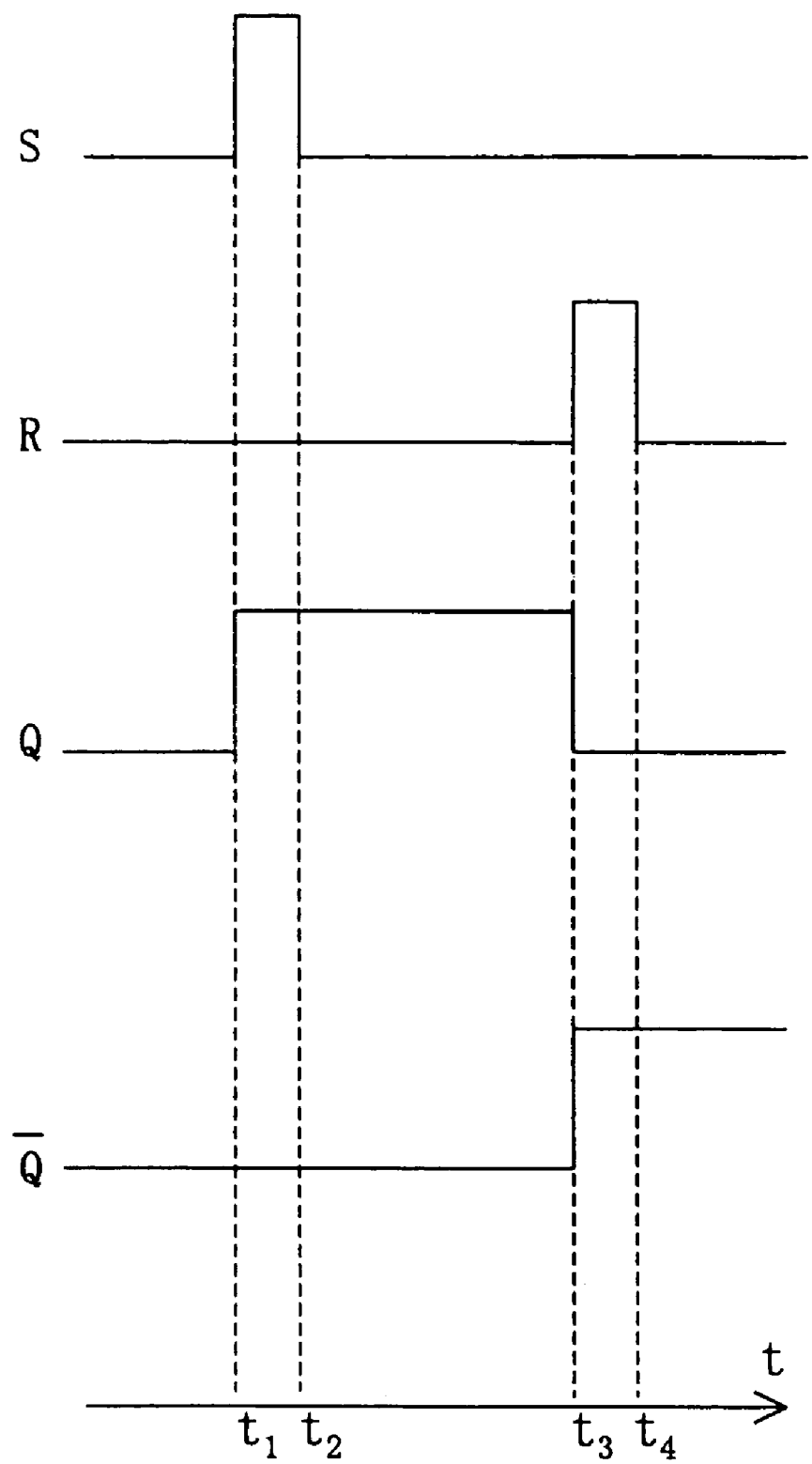
FIG. 3 is a timing chart illustrating operation of an all-optical flip-flop, with a horizontal axis showing time, and a vertical axis showing power of a set pulse S, a reset pulse R, non-inverting output Q, and inverting output Q-bar.

Next, a description is given with reference to FIG. 3 of the operation of this embodiment. It is taken that initial conditions are such that the non-inverting output Q and the inverting output Q-bar are zero.

(Setting Operation)

First, at time $t_1$, a set pulse is inputted to the set port 321. As a result, the following operation occurs.

1) Laser oscillation occurs at the activation layer 20 due to input of the set pulse.

2) Generated laser light is transmitted through the waveguide 30 in the same way as for a usual laser.

3) Only pre-defined modes are established at the multimode interference portion 31. Namely, light only reciprocates between the set port 321 and the non-inverting output port 331. This kind of mode employing a set pulse is referred to in the following as a "set mode". In this state, the gain of the laser is consumed only by this set mode, which means that while one of two modes of oscillation is taking place, it is not possible for the remaining mode of oscillation to take place.

4) Absorption saturation occurs at the saturable absorption region 34 provided at the set port 321 due to the power of the inputted light, resulting in transparency. Oscillation of light passing through the set port 321 is therefore substantially not hindered by the saturable absorption region 34.

It is therefore possible to obtain a non-inverting output Q from the non-inverting output port 331 in this embodiment.

The set pulse is then put to off at time $t_2$. The aforementioned oscillating state therefore continues as is and the set state can be maintained.

(Resetting Operation)

Next, at time $t_3$, a reset pulse is inputted to the reset port 322. As a result, the following operation occurs.

1) Laser oscillation occurs at the activation layer 20 due to input of a reset pulse.

2) Generated laser light is reciprocated backwards and forwards through the waveguide 30 in the same way as for a usual laser.

3) The gain of oscillation in the set mode decreases at the multimode interference portion 31 due to oscillation caused by the reset pulse. Namely, it is preferable to have a reset pulse of a power capable of sufficiently reducing oscillation gain in the set mode. When the oscillation gain due to a reset pulse becomes large, only this mode of oscillation (referred to in the following as "reset mode") is established. In other words, light reciprocates backwards and forwards between the reset port 322 and the inverting output port 332. In other words, in this state, the laser oscillation gain is consumed by the reset mode, and the gain of oscillation in the set mode substantially no longer exists.

4) Absorption saturation occurs at the saturable absorption region 34 provided at the reset port 322 due to the power of the reset pulse, resulting in transparency. The saturable absorption region 34 therefore does not hinder oscillation of light in reset mode.

5) On one side, the oscillation gain of the set mode is lowered, and the power of light in the set mode therefore becomes small. In doing so, the saturable absorption region 34 provided at the set port 321 absorbs light in set mode. As a result, oscillation of light in set mode is made to end quickly. It is therefore possible to rapidly switch over from set mode to reset mode.

As a result of the above operation, it is possible to obtain the inverted output Q-bar (Q inverted) from the inverting output port 332.

The reset pulse is then put to off at time $t_4$. Oscillation in the reset mode then continues as is and the resetting state can be maintained. The operation of returning again to the setting state is the same as described previously and description thereof is omitted.

According to this embodiment, it is possible to realize an all-optical flip-flop operation with a simple structure.

Further, in this embodiment, single mode light is made to be transmitted by the input/output ports 32 and 33, and it is therefore possible to make the outputted light single mode light.

Next, a description is given of a practical example of an all-optical flip-flop of this embodiment. An example of a method of manufacturing the flip-flop used in this embodiment is now described using FIG. 4. First, n-InP is formed to a thickness of 200 nm at the surface (upper surface in FIG. 4) of an n-InP substrate. A Q-layer (described later) is then formed to a thickness of 120 nm. An MQW layer is then formed thereon to a thickness of 100 nm. A Q-layer is then formed on top of this to a thickness of 120 nm. On top of this, a P-InP layer is formed to a thickness of 1000 nm. A P-InGaAs layer is then formed to a thickness of 200 nm on top of this. The Q-layer is configured with a composition of InGaAsP, and a bandgap $\lambda g=1.25$ μm. The MQW layer is laminated from five sets of quantum wells of well layer composition: InGaAsP, well layer depth 10 nm, barrier layer composition: same as the Q-layer, and barrier layer thickness 10 nm. The band gap $\lambda g$ for the MQW layer is taken to be $\lambda g=1.55$ μm.

Figure 4:
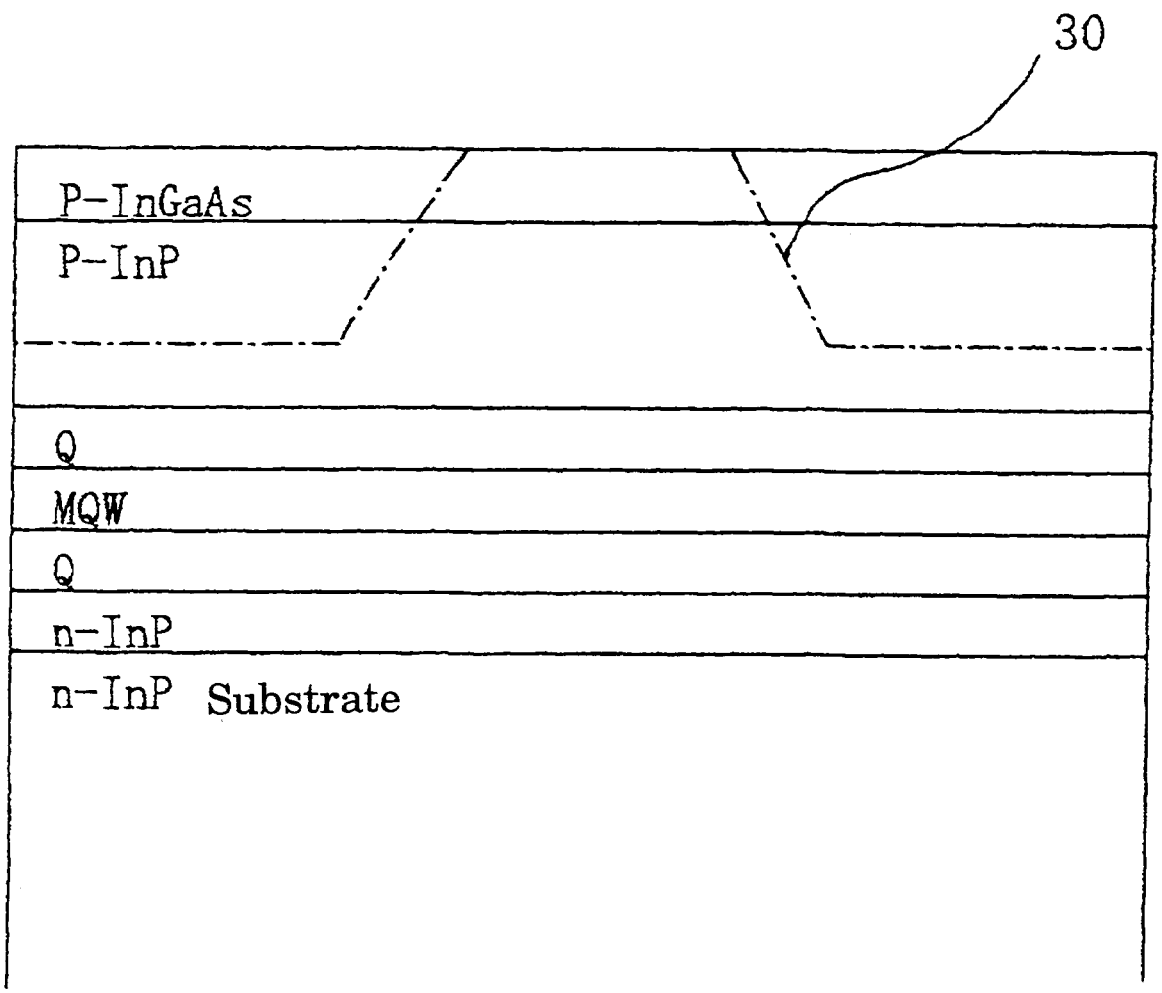
FIG. 4 is a view illustrating an example of a method of manufacturing an all-optical flip-flop of this embodiment.

After lamination in the above manner, etching is carried out so as to give the shape shown by the dotted-and-dashed line in FIG. 4. A waveguide 30 of the desired shape can then be formed using etching. Namely, the multimode interference portion 31, input port 32 and output port 33 can be formed.

Figure 2:
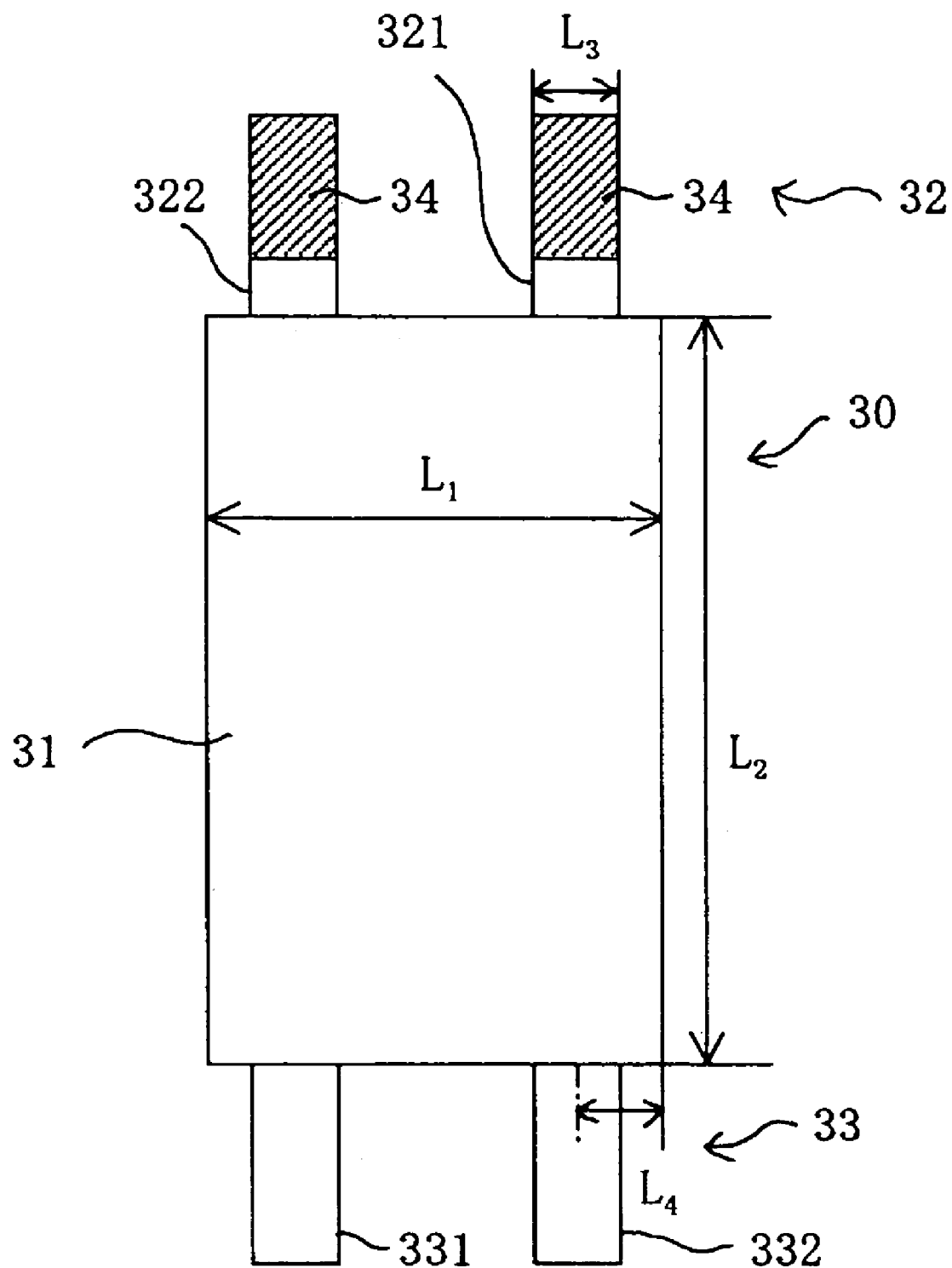
FIG. 2 is a plan view showing a waveguide part of an all-optical flip-flop.

Further, dimensions of the waveguides of this embodiment are described with reference to FIG. 2.

Figure 5:
FIG. 5 is a view illustrating results for this embodiment, with FIG. 5(a) showing an oscillating state in a set mode, and FIG. 5(b) showing the same in a reset mode.
Figure 5:

Width $L_1$ of multimode interference portion 31:12 μm
Length $L_2$ of multimode interference portion 31:540 μm
Width $L_3$ of input/output ports: 2 μm
Length $L_4$ from end of multimode interference portion 31 to center of input/output port: 4 μm Value calculations and simulations are carried out using the conditions of this embodiment. As a result, the existence of a flip-flop operation as shown in FIG. 3 can be confirmed. The states of two modes obtained by simulation are shown in FIG. 5. FIG. 5(a) shows oscillation conditions in the set mode, and FIG. 5(b) shows the same in the reset mode. It can be confirmed that state transitions are made to occur between these modes using input of a set pulse and a reset pulse. Stable oscillation can be confirmed for these modes. In FIG. 5, portions of high photon density are shown using high brightness.

Figures 6, 6A:
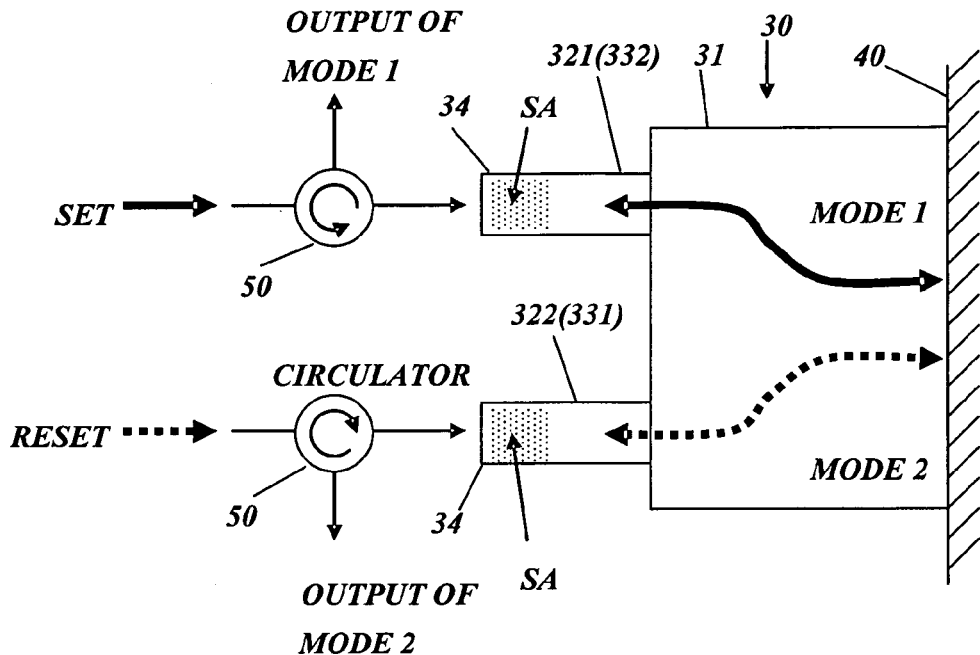
FIG. 6 is a plan view showing an outline configuration for an all-optical flip-flop of a second embodiment of the present invention.
FIG. 6A is a logic table for the all-optical flip-flop of FIG. 6.
Figure 6B:
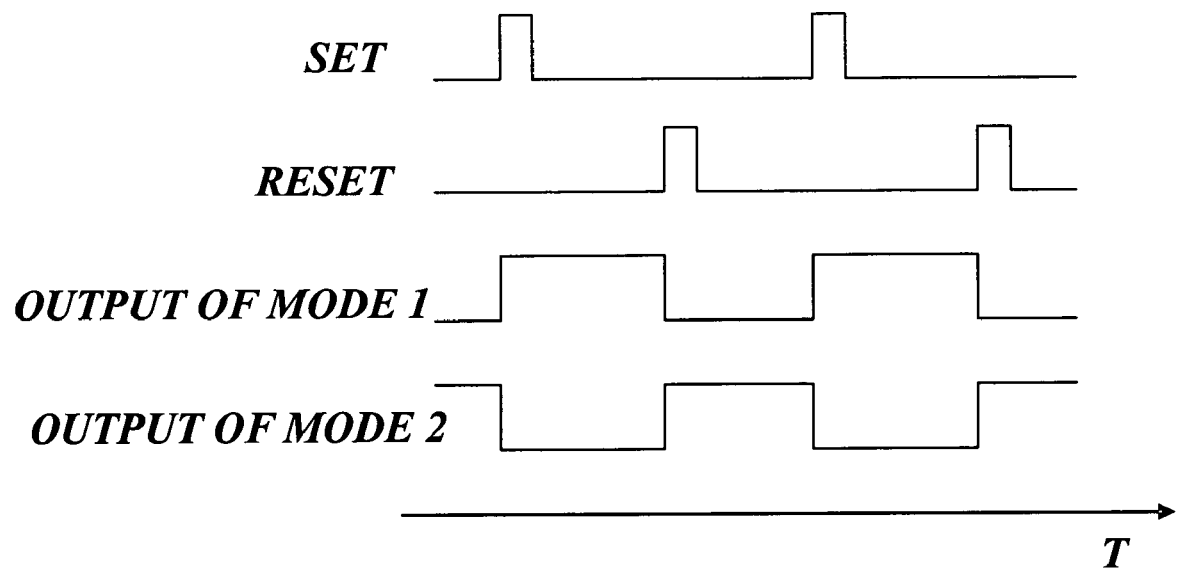
FIG. 6B is a diagram illustrating the logic gates for the all-optical flip-flop of FIG. 6.

Next, a description is given based on FIG. 6 of an all-optical flip-flop of a second embodiment of the present invention. In this embodiment, a mirror 40 for reflecting inputted light is provided at a central part of the multimode interference portion 31. Further, the input/output ports are combined. This is to say that the set port 321 doubles as the inverting output port 332 and the reset port 322 doubles as the non-inverting output port 331. In short, the configuration of the waveguide 30 of the first embodiment is substantially folded around to the position of the mirror 40. As a result of doing this, the functions are equivalent to those of the first embodiment. However, it is possible to reduce the size of the device. Circulators 50 for sorting inputted/outputted light and allowing inputted/outputted light to pass in prescribed directions are fitted to the input/output ports. The functions possessed by the circulators 50 themselves are publicly known. Other aspects of the configuration and operation are the same as for the first embodiment and are not described here.

EXPERIMENTAL EXAMPLE

An experimental examples is described in the following based on the structure of the first embodiment.

Experimental conditions: Same as for the examples given in the first embodiment. However, the length of the multimode interference portion 31 is taken to be 595 μm.

Figure 7:
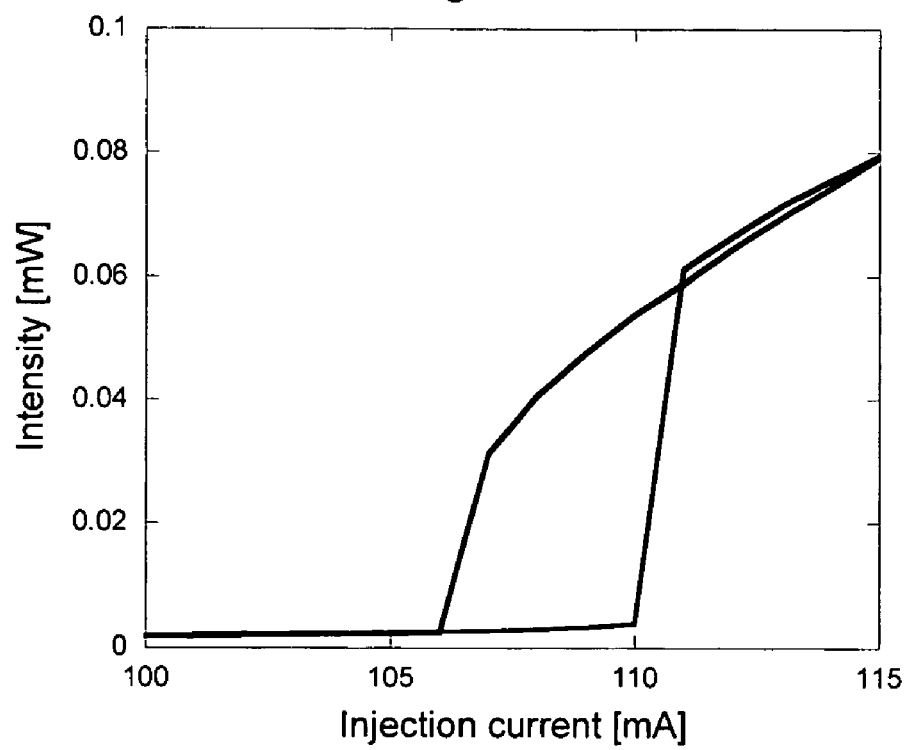
FIG. 7 is a graph showing a characteristic of current versus light output for an all-optical flip-flop of the example of the present invention.
Figure 8:
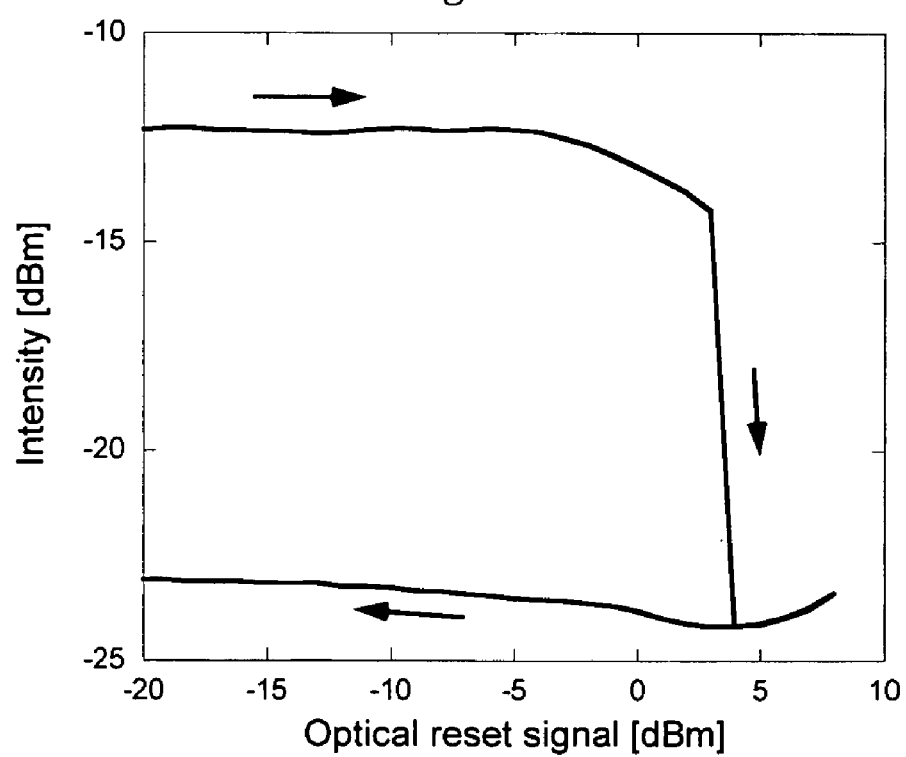
FIG. 8 is a graph showing a light-resetting characteristic for an all-optical flip-flop of the example of the present invention.

A current—light output characteristic of this experimental example is shown in FIG. 7.

In FIG. 7, hysterisis appears at an oscillation threshold value. In the present invention, the multimode interference portion 31 constituting a multimode waveguide is incorporated as part of an oscillator, and it is possible to obtain a clear hysterisis loop using absorption saturation. The reason for this is that the multi-mode interference portion incorporated in the oscillator acts as a countermeasure with regards to manufacturing differences and provides superior stability.

As can be understood from this characteristic, according to the invention of this application, it is possible to define a stable, clear mode of oscillation. In this practical example, current within this hysterisis is biased (namely, operating current is taken to be in the range of 106 to 110 mA). As described in the above embodiment, it is possible to bring about operation as an optical flip-flop by inputting a set pulse and a reset pulse (operating characteristics are as described in the following).

As shown in FIG. 7, oscillation does not occur within this hysterisis prior to inputting of the set pulse. As a result, according to this invention, it is possible to avoid instability such as the unexpected commencement of oscillation before the set pulse is inputted. Namely, this invention exhibits a characteristic of "carry out oscillation based on a set pulse and a reset pulse". Further, oscillation starts due to the set pulse input. This has the benefit that an initial flip-flop state is clearly defined. As a result of this oscillation, a flip-flop operation where switching of outputted light takes place is carried out.

Static characteristics for optical resetting in this practical example are shown in FIG. 7.

According to this, it can be understood that oscillation of the set pulse can be stopped by causing a reset pulse to be incident from one of a plurality of input ports, with the intensity of the incident light being in the order of 2 mW. In this practical example, incident light is provided by connecting an optical fiber to the input port. It can be understood that the difference in intensity between the ON state and the OFF state is also ten times or more. It can also be understood that this optical flip-flop operates in a wavelength range in the order of 15 to 20 nm taking an emission wavelength of 1560 nm as center, and therefore operates in a broad range of wavelengths.

Figure 9:
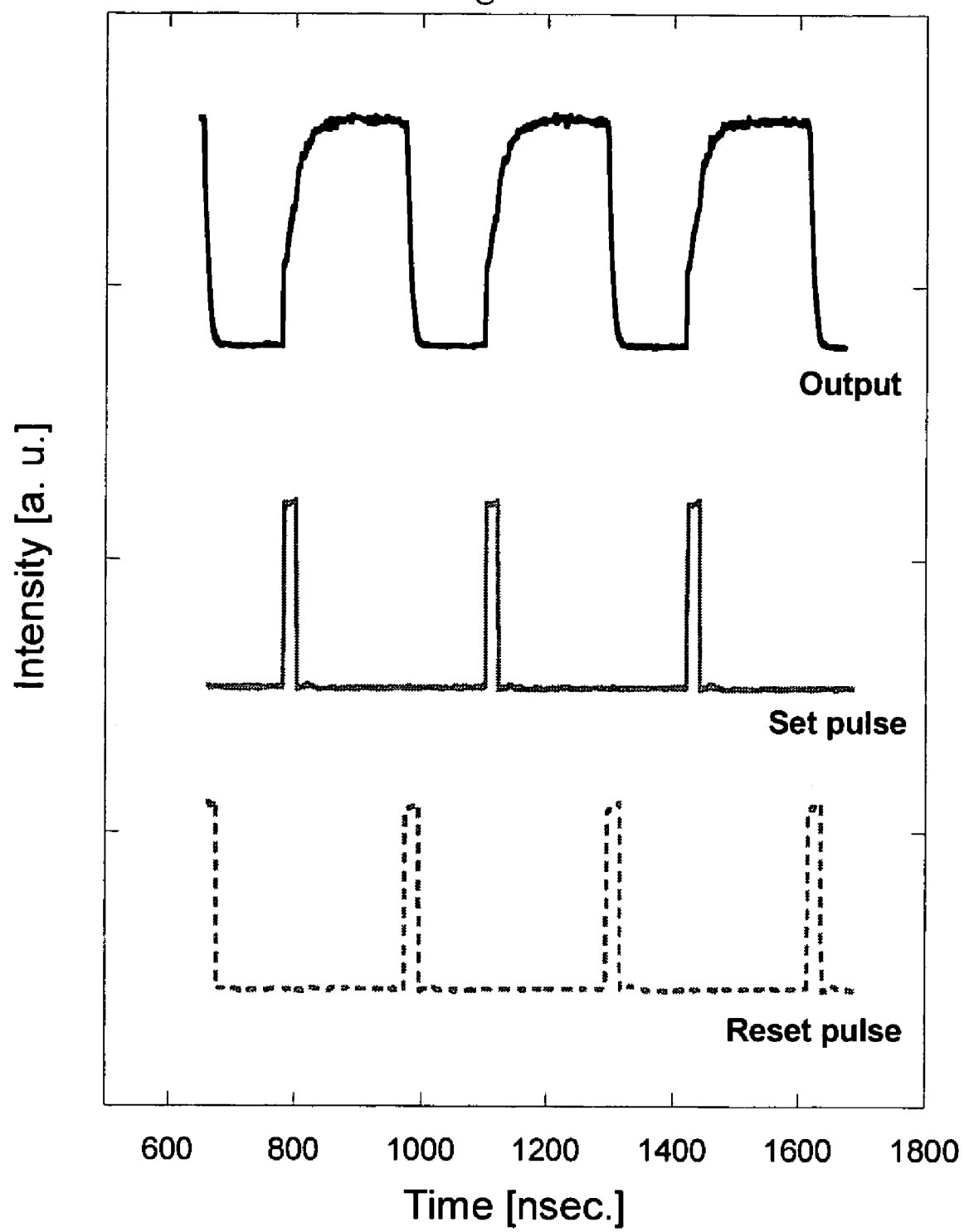
FIG. 9 is a graph showing a dynamic characteristic for an all-optical flip-flop of the example of the present invention.

A dynamic characteristic when operating as an actual optical flip-flop is shown in FIG. 9.

As shown in FIG. 9, it can be understood that oscillation of the output mode repeatedly goes on and off every time light setting and resetting signals are inputted.

As is also shown in this practical example, by using the all-optical flip-flop of the present invention, it is possible to realize an optical flip-flop having practical intensity of incident light, wavelength operation range, and on/off ratio etc. with existing optical device technology in use today.

In each of the embodiments, a single mode waveguide structure is adopted for the input/output ports 32 and 33 but a multi-mode structure may also be adopted.

Further, in the aforementioned embodiments, two output ports are provided, but it is also possible to just have one in cases where just one of the inverting output and the non-inverting output are used.

Figure 10:
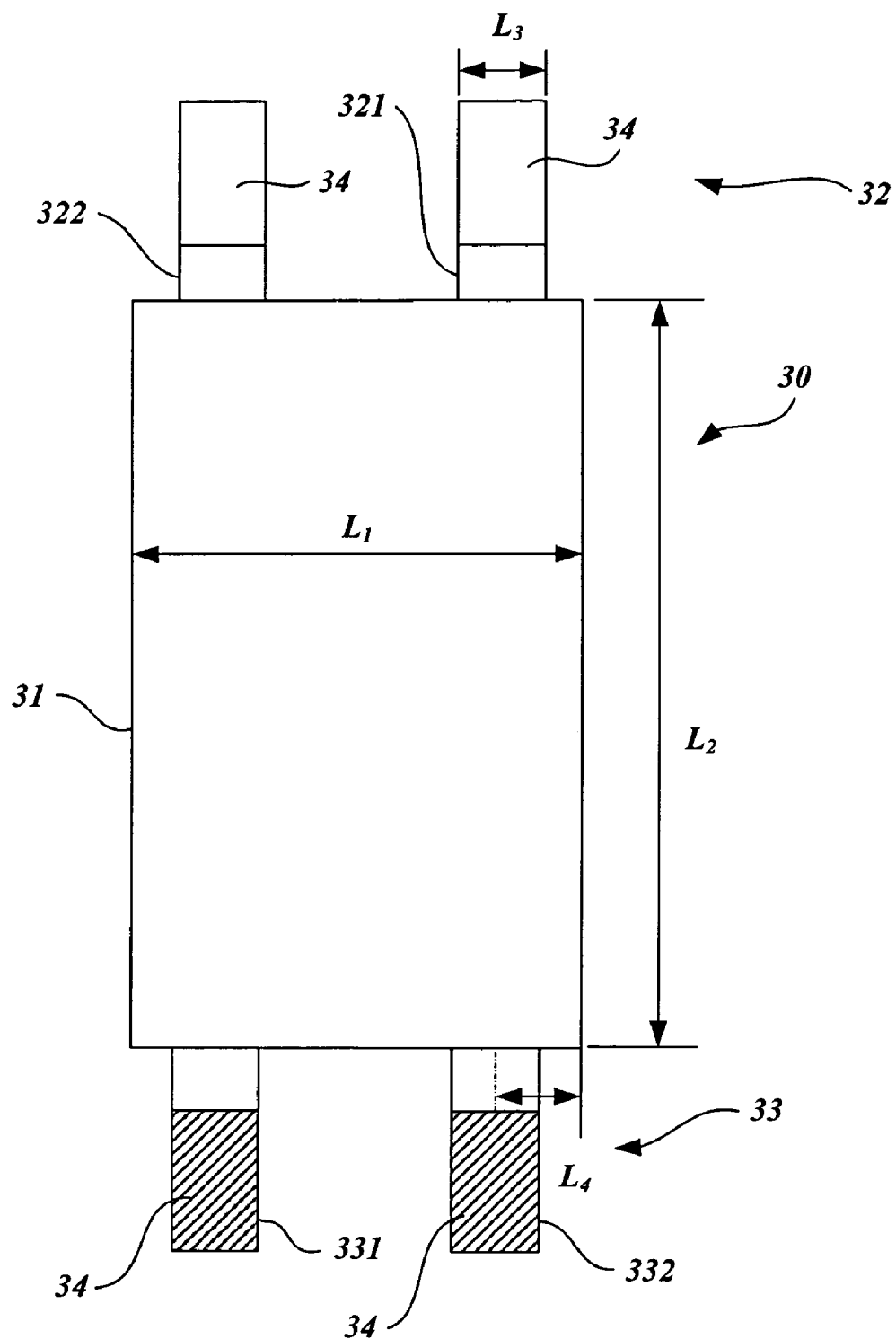
FIG. 10 is a plan view showing a waveguide part of an all-optical flip-flop of the first embodiment.

Moreover, in each of the aforementioned embodiments, saturable absorption regions (SA) are provided at the input ports, but these may also be provided at the output ports. In this case, also, the theory of operation is the same as described above. FIG. 10 illustrates saturable absorption regions 34 in non-inverting output port 331 and inverting output port 332.

In each of the embodiments, the set port 321 and the reset port 322 are next to each other, but the present invention is by no means limited in this respect. For example, the position of the set port 332 may also be taken as the position (i.e. a position on the opposite side to the set port 321) of the inverting output port 332 shown in FIG. 2. At this time, the position of the inverting output port 332 may also be taken to be the position of the setting port 322. Therefore, fundamentally, any position for the input port is appropriate providing that the gain of one mode is lost and oscillation of the other mode is established. The position of the output port may be any position enabling extraction of outputted light in a certain mode.

Each of the above described embodiments and practical examples are merely given as examples and in no way show indispensable configurations of the present invention. Each part of the configuration is not limited to that stated above providing that the essential essence of the present invention is achieved.

According to the present invention, it is possible to provide a set-reset flip-flop capable of operating in an all-optical manner.

What is claimed is:

1. An all-optical flip-flop comprising a semiconductor laser, the semiconductor laser being equipped with a waveguide, the waveguide being equipped with a multi-mode interference portion, a plurality of input ports and at least one output port, the input and output ports being connected to the multi-mode interference portion, with configuration being such that a set pulse from one or more input ports and a reset pulse from one or more remaining input ports is inputted to the multi-mode interference portion, wherein the multi-mode interference portion transmits multi-mode light within, with light outputted due to oscillation based on the set pulse and the reset pulse inputted from the input ports being selectively outputted from the output port, wherein the oscillation is generated in different modes within the multi-mode interference portion in accordance with the set pulse and the reset pulse inputted into the multi-mode interference portion.

2. The all-optical flip-flop as disclosed in claim 1, wherein oscillation based on the set pulse and the reset pulse generates different modes according to the set pulse and the reset pulse.

3. The all-optical flip-flop as disclosed in claim 1, wherein a plurality of output ports are provided.

4. The all-optical flip-flop as disclosed in claim 1, wherein the input ports and the output port are capable of allowing single mode light to pass.

5. The all-optical flip-flop as disclosed in claim 1, wherein saturable absorption regions are provided at the input ports or the output port.

6. The all-optical flip-flop as disclosed in claim 1, wherein end surfaces of the input ports and the output port are reflecting surfaces.

7. The all-optical flip-flop as disclosed in claim 1, wherein an input port doubles as the output port.

8. The all-optical flip-flop as disclosed in claim 7, wherein a mirror for reflecting inputted light is provided at the multi-mode interference.

9. The all-optical flip-flop as disclosed in claim 7, wherein circulators for switching over paths for inputted and outputted light are fitted at the input ports doubling as the output ports.

10. An all-optical flip-flop comprising a semiconductor laser, the semiconductor laser being equipped with a waveguide, the waveguide being equipped with a multi-mode interference portion, a plurality of input ports and at least one output port, the input and output ports being connected to the multi-mode interference portion, with configuration being such that a set pulse from one or more input ports and a reset pulse from one or more remaining input ports is inputted to the multi-mode interference portion, wherein the multi-mode interference portion transmits multi-mode light within, with light outputted due to oscillation based on the set pulse and the reset pulse inputted from the input ports being selectively outputted from the output port using multimode interference, wherein the oscillation is generated in different modes within the multi-mode interference portion in accordance with the set pulse and the reset pulse inputted into the multi-mode interference portion.

11. The all-optical flip-flop as disclosed in claim 1, wherein said multi-mode light transmits within the multi-mode interference portion selectively and in an intersecting manner within.

12. The all-optical flip-flop as disclosed in claim 1, wherein the multi-mode interference portion outputs said multi-mode light from the output port.

13. The all-optical flip-flop as disclosed in claim 1, wherein the oscillation in the multi-mode interference portion is due to the set pulse or reset pulse inputted from one or more input ports.

14. The all-optical flip-flop as disclosed in claim 1, wherein the multi-mode interference portion constitutes at least a portion of an oscillator of the semiconductor laser.

15. The all-optical flip-flop as disclosed in claim 1, wherein the input ports and the output port reflect a part of light generated by the oscillation within the multi-mode interference portion in order to maintain lasing oscillation of the semiconductor laser.

16. The all-optical flip-flop as disclosed in claim 1, wherein the oscillation based on the set pulse and the reset pulse is generated between an input port and an output port.

17. The all-optical flip-flop as disclosed in claim 1, wherein the multi-mode interference portion transmits any multi-mode light through an output port as an output light.

* * * * *

UNITED STATES PATENT AND TRADEMARK OFFICE
CERTIFICATE OF CORRECTION

PATENT NO. : 7,292,746 B2
APPLICATION NO. : 10/799786
DATED : November 6, 2007
INVENTOR(S) : Y. Nakano et al.

It is certified that error appears in the above-identified patent and that said Letters Patent is hereby corrected as shown below:

| COLUMN | LINE | ERROR |
|---|---|---|
| Title page, item (56) Pg. 1, col. 1 | Refs. Cited (Other Publs, Item 1) | delete "Jian, B.B. Continuous-wave...." |

Signed and Sealed this

Eighth Day of July, 2008

JON W. DUDAS
*Director of the United States Patent and Trademark Office*